US012761612B2

(12) United States Patent
Torai et al.

(10) Patent No.: US 12,761,612 B2
(45) Date of Patent: Oct. 13, 2026

(54) ANALYSIS METHOD, NON-TRANSITORY COMPUTER-READABLE RECORDING MEDIUM AND INFORMATION PROCESSING DEVICE FOR ASSISTING OPERATOR IN QUICK DECISION MAKING

(71) Applicant: Yokogawa Electric Corporation, Tokyo (JP)

(72) Inventors: Soichiro Torai, Tokyo (JP); Shinichi Chiyoda, Tokyo (JP); Kenichi Ohara, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 555 days.

(21) Appl. No.: 18/272,293

(22) PCT Filed: Dec. 6, 2021

(86) PCT No.: PCT/JP2021/044709
§ 371 (c)(1),
(2) Date: Jul. 13, 2023

(87) PCT Pub. No.: WO2022/163132
PCT Pub. Date: Aug. 4, 2022

(65) Prior Publication Data
US 2024/0142922 A1 May 2, 2024

(30) Foreign Application Priority Data
Jan. 28, 2021 (JP) ................................ 2021-012314

(51) Int. Cl.
*G05B 13/04* (2006.01)
*G05B 13/02* (2006.01)

(52) U.S. Cl.
CPC ......... *G05B 13/048* (2013.01); *G05B 13/027* (2013.01); *G05B 13/041* (2013.01)

(58) Field of Classification Search
CPC ... G05B 13/048; G05B 13/027; G05B 13/041
(Continued)

(56) References Cited

U.S. PATENT DOCUMENTS

2009/0112532 A1* 4/2009 Foslien .................. G05B 15/02 703/2
2019/0094843 A1* 3/2019 Lee .......................... G06N 5/04
(Continued)

FOREIGN PATENT DOCUMENTS

CN 108762238 A 11/2018
JP 2013-41448 A 2/2013
(Continued)

OTHER PUBLICATIONS

International Search Report dated Mar. 1, 2022 filed in PCT/JP2021/044709.

(Continued)

*Primary Examiner* — Jigneshkumar C Patel
(74) *Attorney, Agent, or Firm* — RANKIN, HILL & CLARK LLP

(57) ABSTRACT

An information processing device acquires a prediction result obtained when a premise is applied to a causal model having a plurality of variables related to operation of a plant. Based on the prediction result, the information processing device specifies a relevant variable dependent on the premise from the plurality of variables. Thereafter, with respect to the relevant variable, the information processing device displays information on a state of the relevant variable obtained according to the prediction result and a statistic of plant data corresponding to the relevant variable in plant data that is generated in the plant.

8 Claims, 15 Drawing Sheets

(58) Field of Classification Search
USPC .............................................................. 700/28
See application file for complete search history.

(56) References Cited

U.S. PATENT DOCUMENTS

| | | | | |
|---|---|---|---|---|
| 2019/0384275 | A1* | 12/2019 | Shida ................. | G05B 23/0283 |
| 2021/0191380 | A1 | 6/2021 | Minemoto et al. | |
| 2021/0240174 | A1* | 8/2021 | Wang ................... | G05B 23/021 |

FOREIGN PATENT DOCUMENTS

| | | | |
|---|---|---|---|
| JP | 2013-218725 | A | 10/2013 |
| JP | 2018-128855 | A | 8/2018 |
| JP | 2020-9080 | A | 1/2020 |
| JP | 2020149289 | A | 9/2020 |

OTHER PUBLICATIONS

Chinese Office Action (CNOA) dated Sep. 6, 2025 issued for Chinese patent application No. 202180091783.7 and its English machine translation.
Chinese Office Action dated Mar. 20, 2026 for Chinese Patent Application No. 202180091783.7; English machine translation.

* cited by examiner

| TIME | Tag A1 | Tag A2 | Tag A3 | Tag B1 | ... |
|---|---|---|---|---|---|
| t1 | 15 | 110 | 1.8 | 70 | ... |
| ... | ... | ... | ... | ... | ... |

FIG.4

| TIME | Tag A1 | Tag A2 | Tag A3 | Tag B1 | ··· |
|---|---|---|---|---|---|
| t1 | 10-20 | 100-150 | 1.5-2.5 | 65-80 | ··· |
| t2 | 10-20 | 50-100 | 0.5-1.5 | 80-95 | ··· |
| t3 | 5-10 | 150-200 | 2.5-3.5 | 95-110 | ··· |
| t4 | 20-30 | 150-200 | 0.5-1.5 | 80-95 | ··· |
| t5 | 20-30 | 150-200 | 0.5-1.5 | 80-95 | ··· |
| t6 | 20-30 | 50-100 | 0.5-1.5 | 95-110 | ··· |
| t7 | 5-10 | 100-150 | 1.5-2.5 | 80-95 | ··· |
| t8 | 10-20 | 100-150 | 1.5-2.5 | 65-80 | ··· |
| t9 | 10-20 | 50-100 | 2.5-3.5 | 65-80 | ··· |
| · | · | · | · | · | · |
| · | · | · | · | · | · |
| · | · | · | · | · | · |

FIG.5

| TIME | Tag A1 | Tag A2 | Tag A3 | Tag B1 | ··· |
|---|---|---|---|---|---|
| t1 | 10-20 | 100-150 | 1.5-2.5 | 65-80 | ··· |
| t2 | 10-20 | 50-100 | 0.5-1.5 | 80-95 | ··· |
| t3 | 5-10 | 150-200 | 2.5-3.5 | 95-110 | ··· |
| t4 | 20-30 | 150-200 | 0.5-1.5 | 80-95 | ··· |
| t5 | 20-30 | 150-200 | 0.5-1.5 | 80-95 | ··· |
| t6 | 20-30 | 50-100 | 0.5-1.5 | 95-110 | ··· |
| t7 | 5-10 | 100-150 | 1.5-2.5 | 80-95 | ··· |
| t8 | 10-20 | 100-150 | 1.5-2.5 | 65-80 | ··· |
| t9 | 10-20 | 50-100 | 2.5-3.5 | 65-80 | ··· |
| · | · | · | · | · | · |
| · | · | · | · | · | · |
| · | · | · | · | · | · |

CLUSTERING WITH NUMBER OF CLUSTERS THAT IS THREE (a)

| TIME | P (Cluster 1) | P (Cluster 2) | P (Cluster 3) | CLUSTER WITH LARGEST MEMBERSHIP PROBABILITY |
|---|---|---|---|---|
| t1 | 0.40 | 0.30 | 0.30 | Cluster 1 |
| t2 | 0.45 | 0.35 | 0.20 | Cluster 1 |
| t3 | 0.55 | 0.25 | 0.20 | Cluster 1 |
| t4 | 0.55 | 0.20 | 0.25 | Cluster 1 |
| t5 | 0.30 | 0.40 | 0.30 | Cluster 2 |
| t6 | 0.15 | 0.60 | 0.25 | Cluster 2 |
| t7 | 0.10 | 0.70 | 0.20 | Cluster 2 |
| t8 | 0.20 | 0.65 | 0.15 | Cluster 2 |
| t9 | 0.05 | 0.35 | 0.60 | Cluster 3 |
| · | · | · | · | · |
| · | · | · | · | · |
| · | · | · | · | · |

(b)

| TAG | P (Cluster 1) | P (Cluster 2) | P (Cluster 3) | CLUSTER WITH LARGEST MEMBERSHIP PROBABILITY |
|---|---|---|---|---|
| Tag A1 | 0.3 | 0.3 | 0.4 | Cluster 3 |
| Tag A2 | 0.4 | 0.5 | 0.1 | Cluster 2 |
| Tag A3 | 0.15 | 0.25 | 0.6 | Cluster 3 |
| Tag B1 | 0.15 | 0.15 | 0.7 | Cluster 3 |
| · | · | · | · | · |
| · | · | · | · | · |
| · | · | · | · | · |

(a)

| UPPER \ LOWER | Tag A1 | Tag A2 | Tag A3 | ... | Tag B1 | ... |
|---|---|---|---|---|---|---|
| Tag A1 | - | - | - | ... | 1 | ... |
| Tag A2 | - | - | - | ... | - | ... |
| Tag A3 | - | - | - | ... | - | ... |
| ... | ... | ... | ... | ... | ... | ... |
| Tag B1 | 0 | - | - | ... | - | ... |
| ... | ... | ... | ... | ... | ... | ... |

FIG.7

PRE-PROCESSED DATA / CLUSTERING RESULT

| TIME | Tag A1 | Tag A2 | Tag A3 | Tag B1 | P (Cluster 1) | P (Cluster 2) | P (Cluster 3) |
|---|---|---|---|---|---|---|---|
| t1 | 10-20 | 100-150 | 1.5-2.5 | 65-80 | **0.40** | 0.30 | 0.30 |
| t2 | 10-20 | 50-100 | 0.5-1.5 | 80-95 | **0.45** | 0.35 | 0.20 |
| t3 | 5-10 | 150-200 | 2.5-3.5 | 95-110 | **0.55** | 0.25 | 0.20 |
| t4 | 20-30 | 150-200 | 0.5-1.5 | 80-95 | **0.55** | 0.20 | 0.25 |
| t5 | 20-30 | 150-200 | 0.5-1.5 | 80-95 | 0.30 | **0.40** | 0.30 |
| t6 | 20-30 | 50-100 | 0.5-1.5 | 95-110 | 0.15 | **0.60** | 0.25 |
| t7 | 5-10 | 100-150 | 1.5-2.5 | 80-95 | 0.10 | **0.70** | 0.20 |
| t8 | 10-20 | 100-150 | 1.5-2.5 | 65-80 | 0.20 | **0.65** | 0.15 |
| t9 | 10-20 | 50-100 | 2.5-3.5 | 65-80 | 0.05 | 0.35 | **0.60** |
| . | . | . | . | . | . | . | . |
| . | . | . | . | . | . | . | . |
| . | . | . | . | . | . | . | . |

DATASET UTILIZING MEMBERSHIP PROBABILITY VALUE

| Tag A1 | Tag A2 | Tag A3 | Tag B1 | Cluster 1 | Cluster 2 | Cluster 3 | QUALITY |
|---|---|---|---|---|---|---|---|
| 10-20 | 100-150 | 1.5-2.5 | 65-80 | 1 | 0 | 0 | 1 |
| 10-20 | 100-150 | 1.5-2.5 | 65-80 | 1 | 0 | 0 | 1 |
| 10-20 | 100-150 | 1.5-2.5 | 65-80 | 1 | 0 | 0 | 1 |
| 10-20 | 100-150 | 1.5-2.5 | 65-80 | 1 | 0 | 0 | 1 |
| 10-20 | 100-150 | 1.5-2.5 | 65-80 | 0 | 1 | 0 | 1 |
| 10-20 | 100-150 | 1.5-2.5 | 65-80 | 0 | 1 | 0 | 0 |
| 10-20 | 100-150 | 1.5-2.5 | 65-80 | 0 | 1 | 0 | 1 |
| 10-20 | 100-150 | 1.5-2.5 | 65-80 | 0 | 0 | 1 | 0 |
| 10-20 | 100-150 | 1.5-2.5 | 65-80 | 0 | 0 | 1 | 1 |
| 10-20 | 100-150 | 1.5-2.5 | 65-80 | 0 | 0 | 1 | 1 |

CORRESPONDING TO 40%

CORRESPONDING TO 30%

CORRESPONDING TO 30%

FIG.8

PRE-PROCESSED DATA / CLUSTERING RESULT

| TIME | Tag A1 | Tag A2 | Tag A3 | Tag B1 | P (Cluster 1) | P (Cluster 2) | P (Cluster 3) |
|---|---|---|---|---|---|---|---|
| t1 | 10-20 | 100-150 | 1.5-2.5 | 65-80 | **0.40** | 0.30 | 0.30 |
| t2 | 10-20 | 50-100 | 0.5-1.5 | 80-95 | **0.45** | 0.35 | 0.20 |
| t3 | 5-10 | 150-200 | 2.5-3.5 | 95-110 | **0.55** | 0.25 | 0.20 |
| t4 | 20-30 | 150-200 | 0.5-1.5 | 80-95 | **0.55** | 0.20 | 0.25 |
| t5 | 20-30 | 150-200 | 0.5-1.5 | 80-95 | 0.30 | **0.40** | 0.30 |
| t6 | 20-30 | 50-100 | 0.5-1.5 | 95-110 | 0.15 | **0.60** | 0.25 |
| t7 | 5-10 | 100-150 | 1.5-2.5 | 80-95 | 0.10 | **0.70** | 0.20 |
| t8 | 10-20 | 100-150 | 1.5-2.5 | 65-80 | 0.20 | **0.65** | 0.15 |
| t9 | 10-20 | 50-100 | 2.5-3.5 | 65-80 | 0.05 | 0.35 | **0.60** |
| . | . | . | . | . | . | . | . |
| . | . | . | . | . | . | . | . |
| . | . | . | . | . | . | . | . |

DATASET EXPRESSING MEMBERSHIP BY "0" OR "1" FROM LARGEST VALUE OF MEMBERSHIP PROBABILITY

| TIME | Tag A1 | Tag A2 | Tag A3 | Tag B1 | Cluster 1 | Cluster 2 | Cluster 3 | QUALITY |
|---|---|---|---|---|---|---|---|---|
| t1 | 10-20 | 100-150 | 1.5-2.5 | 65-80 | **1** | 0 | 0 | 1 |
| t2 | 10-20 | 50-100 | 0.5-1.5 | 80-95 | **1** | 0 | 0 | 1 |
| t3 | 5-10 | 150-200 | 2.5-3.5 | 95-110 | **1** | 0 | 0 | 1 |
| t4 | 20-30 | 150-200 | 0.5-1.5 | 80-95 | **1** | 0 | 0 | 1 |
| t5 | 20-30 | 150-200 | 0.5-1.5 | 80-95 | 0 | **1** | 0 | 1 |
| t6 | 20-30 | 50-100 | 0.5-1.5 | 95-110 | 0 | **1** | 0 | 0 |
| t7 | 5-10 | 100-150 | 1.5-2.5 | 80-95 | 0 | **1** | 0 | 1 |
| t8 | 10-20 | 100-150 | 1.5-2.5 | 65-80 | 0 | **1** | 0 | 0 |
| t9 | 10-20 | 50-100 | 2.5-3.5 | 65-80 | 0 | 0 | 1 | 1 |
| . | . | . | . | . | . | . | . | 1 |
| . | . | . | . | . | . | . | . | . |
| . | . | . | . | . | . | . | . | . |

FIG.11

| (a) INFORMATION CORRESPONDING TO QMM CALCULATED BY PRESENT TECHNIQUE | | | | (b) COMPARISON INFORMATION | | | | | |
|---|---|---|---|---|---|---|---|---|---|
| MANAGEMENT POINT (IMPORTANT TAG) | MANAGEMENT CRITERION | PROBABILITY VALUE | DEGREE OF COMPLIANCE | MANAGEMENT CRITERION OF EXISTING QMM | AVERAGE OF ALL DATA | MODE OF ALL DATA | MAXIMUM OF ALL DATA | MINIMUM OF ALL DATA | STANDARD DEVIATION OF ALL DATA |
| Tag A1 | 20-23°C | 74% | 88% | ○-○°C | ○°C | ○°C | ○°C | ○°C | ○°C |
| Tag B3 | 100-110 rpm | 80% | 91% | ○-○ rpm | ○ rpm | ○ rpm | ○ rpm | ○ rpm | ○ rpm |
| Tag D3 | 50-60 $m^3/h$ | 82% | 75% | ○-○ $m^3/h$ | ○ $m^3/h$ | ○ $m^3/h$ | ○ $m^3/h$ | ○ $m^3/h$ | ○ $m^3/h$ |
| . | . | . | . | . | . | . | . | . | . |
| . | . | . | . | . | . | . | . | . | . |
| . | . | . | . | . | . | . | . | . | . |

PERFORM SENSITIVITY ANALYSIS ON OBJECTIVE VARIABLES

| NODE | POSTERIOR PROBABILITY | DIFFERENCE BETWEEN PROBABILITIES |
|---|---|---|
| **Tag D1** | 0.97 | 0.06 |
| **Cluster 2** | 0.95 | 0.05 |
| **Tag A1** | 0.92 | 0.03 |
| . | . | . |
| . | . | . |

EXTRACT IMPORTANT TAG HAVING SIGNIFICANT EFFECT ON OBJECTIVE VARIABLE

TREND ANALYSIS

CORRELATION ANALYSIS

PREDICT BY Deep Learning

ANALYSIS METHOD, NON-TRANSITORY COMPUTER-READABLE RECORDING MEDIUM AND INFORMATION PROCESSING DEVICE FOR ASSISTING OPERATOR IN QUICK DECISION MAKING

FIELD

The present invention relates to an analysis method, an analysis program, and an information processing device.

BACKGROUND

In various types of plants using petroleum, petrochemistry, chemistry, gas, etc., operating control using process data is executed. The process data is complex multidimensional data under the circumstances that various physical phenomena are complexly intertwined and furthermore environments, such as 4M (machine (facility), method (steps and procedure), man (operator), material (raw material)), vary. Analyzing such complex multidimensional data, specifying elements serving as factors of abnormality, generating a causal relationship of components of the plant and a causal relationship between processes and presenting the causal relationships to an operator, or the like, are performed.

CITATION LIST

Patent Literature

Patent Literature 1: Japanese Laid-open Patent Publication No. 2013-41448

Patent Literature 2: Japanese Laid-open Patent Publication No. 2013-21875

Patent Literature 3: Japanese Laid-open Patent Publication No. 2018-128855

Patent Literature 4: Japanese Laid-open Patent Publication No. 2020-9080

SUMMARY

Technical Problem

With only display of the causal relationships, however, operators have difficulty in taking measures to enable an immediate operation. For example, while display of the causal relationships enables an experienced operator to immediately specify measures for operation, the aspect that data is reduced could end up confusing an operator having limited experience.

In one aspect, an object is to provide an analysis method that makes it possible to assist an operator in quick decision making, an analysis program, and an information processing device.

Solution to Problem

According to an aspect of an embodiment, an analysis method for a computer execute a process including acquiring a prediction result obtained when a premise is applied to a causal model having a plurality of variables related to operation of a plant, based on the prediction result, specifying a relevant variable dependent on the premise from the plurality of variables, and with respect to the relevant variable, displaying information on a state of the relevant variable obtained according to the prediction result and a statistic of plant data corresponding to the relevant variable in plant data that is generated in the plant.

According to an aspect of an embodiment, an analysis program causes a computer to execute a process including acquiring a prediction result obtained when a premise is applied to a causal model having a plurality of variables related to operation of a plant, based on the prediction result, specifying a relevant variable dependent on the premise from the plurality of variables, and with respect to the relevant variable, displaying information on a state of the relevant variable obtained according to the prediction result and a statistic of plant data corresponding to the relevant variable in plant data that is generated in the plant.

According to an aspect of an embodiment, an information processing device includes an acquisition unit that acquires a prediction result obtained when a premise is applied to a causal model having a plurality of variables related to operation of a plant, a specifying unit that, based on the prediction result, specifies a relevant variable dependent on the premise from the plurality of variables, and a display unit that, with respect to the relevant variable, displays information on a state of the relevant variable obtained according to the prediction result and a statistic of plant data corresponding to the relevant variable in plant data that is generated in the plant.

Advantageous Effects of Invention

According to an embodiment, it is possible to assist an operator in quick decision making.

BRIEF DESCRIPTION OF DRAWINGS

FIG. 4 is a diagram illustrating pre-processed data.

FIG. 5 is a diagram illustrating an example of a result of clustering by probabilistic latent semantic analysis.

FIG. 7 is a diagram illustrating an example 1 of generating a training dataset for causal model training.

FIG. 8 is a diagram illustrating an example 2 of generating a training dataset for causal model training.

FIG. 11 is a diagram illustrating an example of presentation of information corresponding to a QMM and calculated by prediction by the Bayesian Network.

DESCRIPTION OF EMBODIMENTS

Figure 1:
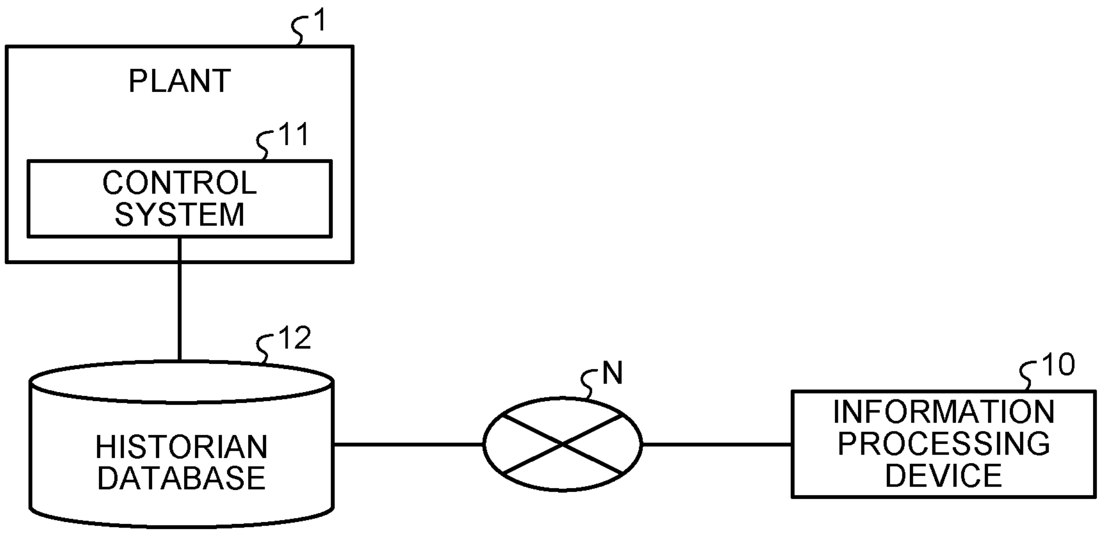
FIG. 1 is a diagram illustrating a system configuration according to a first embodiment.

An embodiment of an analysis method, an analysis program, and an information processing device disclosed in the present application will be described in detail below according to the drawings. Note that the embodiment does not limit the present invention. Note that the embodiment does not limit the present invention. The same components are denoted with the same reference numerals and redundant description can be omitted as appropriate and each embodiment can be combined as appropriate within a range without inconsistency.

Entire Configuration

FIG. 1 is a diagram illustrating a system configuration according to a first embodiment. As illustrated in FIG. 1, the system includes a plant 1, a historian database 12, and an information processing device 10. Note that the plant 1 and the historian database 12 are connected regardless whether the connection is wired or wireless using a dedicated line, or the like, such that communications are enabled. Similarly, the historian database 12 and the information processing device 10 are connected regardless whether the connection is wired or wireless via a network N, such as the Internet or a dedicated line, such that communications are enabled.

The plant 1 includes a plurality of facilities and devices and a control system 11 and is an example of various types of plants using petroleum, petrochemistry, chemistry, gas, etc. The control system 11 is a system that controls operations of each of the facilities that are set in the plant 1. The plant 1 is internally built as a distributed control systems (DCS) and the control system 11 acquires process data, such as a process variable (PV), a setting variable (SV), and a manipulated variable (MV), from a control device, such as a field device that is set in a facility to be controlled and that is not illustrated in the drawing, a manipulative device that corresponds to a facility to be controlled and that is not illustrated in the drawing, or the like.

A field device is a device on site, such as a manipulation device including a measuring function of measuring an operational state (for example, the pressure, the temperature, and the flow rate) of a facility that is set and a function of controlling operations of the facility that is set according to a control signal that is input (for example, an actuator). The field device sequentially outputs the operational state of the facility that is set as process data to the control system 11. The process data also contains information on the types of the process variables that are output (for example, the pressure, the temperature, and the flow rate). Information, such as a tag name that is assigned to identify the field device, is associated with the process data. The process variables that are output as the process data may include not only process variables that are measured by the field device but also calculated values that are calculated from the process variables. Calculation of a calculated value from the process variables may be performed by the field device or may be performed by an external device that is not illustrated in the drawings and that is connected to the field device.

The historian database 12 is a device that saves a log of data in a long period by chronologically saving the process data that is acquired by the control system 11 and is configured, for example, by including various memories, such as a read only memory (ROM), a random access memory (RAN) and a flash memory, and a storage device, such as a hard disk drive (HDD). The log of the saved process data is output to the information processing device 10 via, for example, a dedicated communication network N that is built in the plant 1. Note that the number of the control systems 11 and the historian databases 12 that are connected to the information processing device 10 is not limited to that illustrated in FIG. 1 and a configuration enabled using a plurality of the historian databases 12 and a plurality of the information processing devices 10 may be employed. The historian database 12 may be a component that is incorporated in the control system 11 and that constitutes a control system, such as a distributed control system.

The information processing device 10 generates a causal model using each set of process data that is stored in the historian database 12 and a parent-child relationship of components constituting the plant 1. The information processing device 10 is an example of a computer device that inputs the state of the plant 1 as a premise to the causal model, such as a Bayesian network, generates information operable by an operator, and outputs the information.

Reference Techniques for Operator Display

In order to accurately analyze a factor leading to PQCDS (Productivity, Quality, Cost, Delivery, and Safety), such as the quality of the plant, a procedure of increasing the quality of data by decomposing data with respect to each of similar operating states based on some sort of regularity and a common term and then performing factor analysis using various types of machine learning models with respect to each of the decomposed operating states.

In general, dimensional reduction and clustering are known as a technique of decomposing the state. For example, as for abnormality detection in and diagnosis on facilities in the plant, a technique of, after performing feature extraction using a dimensional reduction method, sorting sensor data into some categories according to the operating state by clustering is known. A technique of increasing abnormality detection sensitivity and diagnosis accuracy by performing modeling on each category is known. These techniques have an advantage in that, because a complex state can be decomposed and expressed using a simple model by expressing a multidimensional data using a low-dimensional model, a phenomenon can be understood or interpreted easily. Principal component analysis, independent component analysis, non-negative matrix factorization, projection to latent structure, and canonical correlation analysis are taken as the dimensional reduction method used here and an EM algorithm and k-means for time trajectory division and mixture distribution are taken as the clustering method.

In the factor analysis using the machine learning model, listing the relationships between objects (results) and explanatory variables (factors) using correlation coefficients and contribution ratios is common, graphical models enabling a graph expression of a probability distribution of explanatory variables using an undirected graph or a directed graph are known. For example, because a directed graph has directionality like that from "factor" to "result" and is an expression form easy for humans to understand, a user is able to instinctively understand factors that have effects directly and indirectly and sometimes newly notices a factor that the user has not noticed.

Bayesian networks are known as graphical models expressing a causal relationship between variables using the directed graph. A Bayesian network retains a quantitative relationship between variables with conditional probability and therefore providing an evidence state (evidence) to a node that is focused enables prediction of a probability distribution of states of other nodes at that time and probability values to that time. For example, a Bayesian network is utilized for analysis on causal relationships of facility alarms of the plant and manipulation of an operator and changes in the state in which the process runs, analysis on causal relationships of devices, sites, and deterioration events, etc.

Point of Improvement in Reference Technique

As for the above-described technique of decomposing a state, while dimensional reduction is in general a method of mapping useful information to a new component (axis) while leaving the useful information as much as possible and thus summarizing the information into a low-dimensional space, that is, extracting the information as a feature, the new component itself is not necessarily physically semantic and interpreting the new component is often difficult. For example, in abnormality detection, it is difficult to explain an abnormality factor in a space of feature that is not much physically semantic and, in the case where explanation of a factor is emphasized, the detection may be dealt with as an error detection because of insufficient reason.

On the other hand, general clustering is a method of performing grouping based on similarities between sets of data while keeping the original data structure without making data sparse. For example, in the case where similarity is determined based on some sort of "distance scale" as in k-means that is one of hard clustering methods, when data is in a large scale and multidimensional like process data, it is sometimes difficult to perform grouping appropriately. Such difficulty is sometimes expressed as so-called "curse of dimensionality".

In the case where various physical phenomena are complexly intertwined as in the case of process data, classifying by "0%" or "100%" as in hard clustering is often not necessarily appropriate. Thus, there is, as a method that avoids "curse of dimensionality" that can be a problem in dealing with process data and that enables an expression of a degree of membership by a probability value, a soft clustering method that determines similarity based on a "probabilistic occurrence rate (co-occurrence probability under a latent semantic condition)" without a distance scale. There is probabilistic latent semantic analysis (PLSA) as a general soft clustering method.

As for factor analysis, a Bayesian network enabling an expression of a causal relationship between explanatory variables by a directed graph is an algorithm that deals with discrete variables. Thus, in its application to process data, directly dealing with discrete numerical data that is obtained at given intervals from sensors leads to a vast number of nodes and a vast number of states. Accordingly, a computational explosion occurs and a tangled network is caused. As a result, training of the Bayesian network is carried out after generating category data (generating abstract expressions) according to the meanings expressed by numerical data, such as "unstable" or "increase", and therefore, while a whole qualitative trend is roughly understood easily, making an analysis based on specific numerical values based on a reactive process is difficult.

By using, as a method of presenting a factor analysis result, a highlight display of a path with a high probability that is obtained by Bayesian network training or a method of listing in a descending order in probability with respect to devices, sites, and deterioration events, an improvement is made such that the user understands the causal relationship of factors easily. For example, when the object is stabilization of quality in a chemical process, or the like, however, in addition to understanding the causal relationship of factors, presenting also information on a result and on what should be done from the perspective of an operator that enables the operator to make a comparison with a conventional reference and make an examination easily and that the operation can reflect immediately, such as a quality management matrix (QMMV) corresponding to a manufacturing recipe that the operator normally refers to during operation, is important.

Thus, utilizing probabilistic latent semantic analysis and a Bayesian network, the information processing device 10 according to the first embodiment extracts a factor that has an effect on a production management index, such as quality, by machine learning from complex operation data containing environmental changes, such as production four elements for products in the plant. The information processing device 10 assists the operator in quick decision making during operation by converting a machine learning result into a form that is easy for the operator to consider and understand and representing the form.

Explanation of Words

The production four elements used in the first embodiment are machine (facility), method (steps and procedure), man (operator), material (raw material), or the like. Probabilistic latent semantic analysis is one of soft clustering methods and makes it possible to determine similarity according to a probabilistic occurrence rate and express a degree of membership to a cluster. Probabilistic latent semantic analysis also enables clustering on rows and columns at a time. This probabilistic latent semantic analysis is also referred to as PLSA (Probabilistic Latent Semantic Analysis).

The Bayesian network is an example of a probabilistic model or a causal model that visualizes qualitative dependence between a plurality of random variables by a directed graph and expresses a quantitative relationship between individual variables by conditional probability. The production management index is an idea including productivity, quality, cost, delivery, and safety. The production management matrix corresponds to the manufacturing recipe and is one of sets of important information that the operator refers to during operation because information indicating which management point and in which reference range (specific numerical range) the management point is controlled, etc., is written in order to secure the quality of products, etc.

Functional Configuration

Next is a functional block diagram illustrating a functional configuration of each device including the system illustrated in FIG. 1. Note that, because the control system 11 and the historian database 12 have the same configurations as those of a control system and a historian database that are generally used in control management of the plant 1, detailed description will be omitted. The information processing device 10 including functions different from those of a monitoring device and a management device that are generally used in control management of the plant 1 will be described here.

Figures 2, 3:
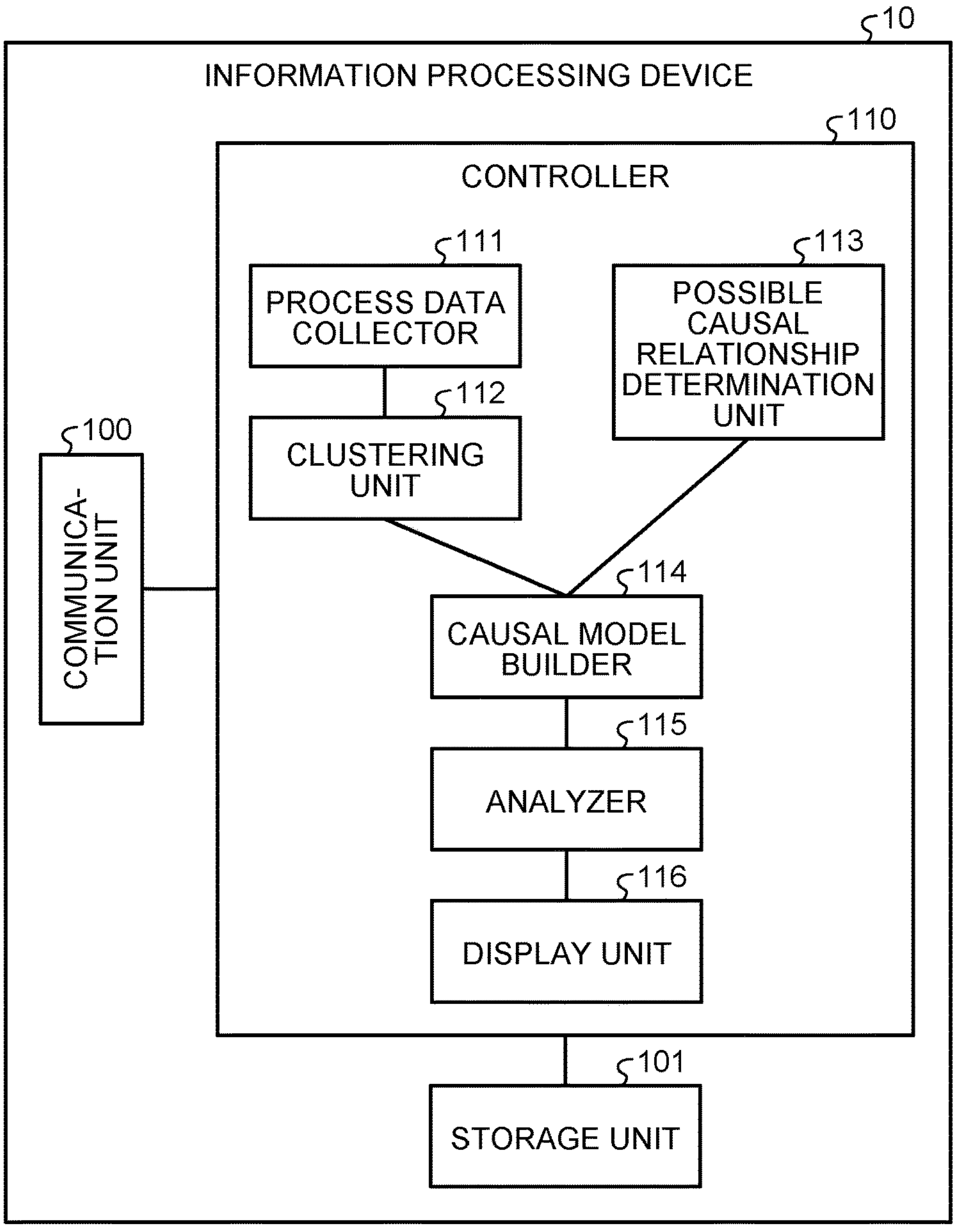
FIG. 2 is a functional block diagram illustrating a functional configuration of an information processing device according to the first embodiment.
FIG. 3 is an example of process data that is collected.

FIG. 2 is a functional block diagram illustrating a functional configuration of the information processing device 10 according to the first embodiment. As illustrated in FIG. 2, the information processing device 10 includes a communication unit 100, a storage unit 101, and a controller 110. The function units that the information processing device 10 includes are not limited to those illustrated in the drawing, and the information processing device 10 may include other function units, such as a display unit that is realized using a display, or the like.

The communication unit 100 is a processor that controls communication with other devices and is realized using, for example, a communication interface, or the like. For example, the communication unit 100 controls communication with the historian database 12, receives the process data from the historian database 12, and transmits a result of execution by the controller 110 to be described below to a terminal device that a manager uses.

The storage unit 101 is a processor that stores various types of data and various types of programs that the controller 110 executes and the storage unit 101 is realized using, for example, a memory and a hard disk, or the like. The storage unit 101 stores various types of data that are generated in a process that the information processing device 10 executes, such as data obtained in a process in which the controller 110 executes various types of processes and a process results obtained by executing the various types of processes.

The controller 110 is a processor that controls the entire information processing device 10 and the controller 110 is realized using, for example, a processor, or the like. The controller 110 includes a process data collector 111, a clustering unit 112, a possible causal relationship determination unit 113, a causal model builder 114, an analyzer 115, and a display unit 116.

The process data collector 111 is a processor that collects process data in chronological order. Specifically, the process data collector 111 issues a requests the historian database 12 to output process data when the information processing device 10 starts an analysis process or regularly at predetermined time intervals and acquires process data that is output in response to the request. The process data collector 111 stores the collected process data in the storage unit 101 or output the process data to the clustering unit 112.

FIG. 3 is an example of the process data that is collected. As illustrated in FIG. 3, the process data is configured with "time, Tag A1, Tag A2, Tag A3, Tag B1, . . . " contained therein. Here, "time" is a time at which process log data is collected. "Tag A1, Tag A2, Tag A3, Tag B1", etc., are information representing process data are, for example, a process variable, a setting variable, and a manipulated variable. The example in FIG. 3 presents that "15, 110, 1.8, and 70" are collected as the process data "Tag A1, Tag A2, Tag A3 and Tag B1".

The clustering unit 112 is a processor that outputs a result of clustering elements of time and elements of tag according to membership probabilities by probabilistic latent semantic analysis to the causal model builder 114. Specifically, the clustering unit 112 performs, as pre-processing, cutting out of an intended analysis subject period and missing value processing and outlier processing on raw data. The clustering unit 112 may perform calculation of derived variables, such as a differential and an integral and a moving average, as required.

Probabilistic latent semantic analysis performs processing by discrete variables (category variables) and thus the clustering unit 112 executes discretization processing of converting numerical data like "1.2" into a category value like "1.0-2.0" on the process data that is numerical data. Equal frequency partition, equal number partition, Chi Merge, etc., are usable as discretization processing. When there is a variable that is focused and that corresponds to, for example, an objective variable, or the like, weighting the variable enables execution of clustering that meets the features of the variable.

FIG. 4 is a diagram illustrating pre-processed data. As illustrated in FIG. 4, the clustering unit 112 executes discretion processing on the process data illustrated in FIG. 3 and generates the pre-processed data illustrated in FIG. 4. For example, the clustering unit 112 converts process data "time=t1, Tag A1=15, Tag A2=110, Tag A3=1.8 . . . " into "time=t1, Tag A1=10-20, Tag A2=100-1150, Tag A3=1.5-2.5 . . . ".

Thereafter, the clustering unit 112 clusters elements of time and elements of tags of the process data by probabilistic latent semantic analysis using a dataset after the pre-processing and calculates respective membership probabilities (P). Here, the number of clusters may be determined based on the domain knowledge of the operator or the number of clusters may be determined using an index for evaluating goodness of a statistical model like AIC (Akaike's Information Criterion).

Note that clustering may be performed for multiple times in stages. For example, by decomposing data in a time direction based on the obtained result of clustering the time elements (corresponding to a result of decomposition according to each operation state) and thereafter performing clustering by probabilistic latent semantic analysis again on each set of decomposed data, the clustering unit 112 is able to extract a highly-relevant tag in the same operation state (cluster) and segment the operation state step by step.

FIG. 5 is a diagram illustrating an example of a result of clustering by probabilistic latent semantic analysis. FIG. 5 illustrates an example in which the number of clusters is three. As illustrated in FIG. 5, by executing probabilistic latent semantic analysis on the pre-processed data, the clustering unit 112 is able to obtain a result of clustering in a row direction in which a similar operation period is extracted (refer to (a) in FIG. 5) and similarly is able to obtain a result of clustering in a column direction in which a relevant tag is extracted (refer to (b) in FIG. 5).

For example, the clustering results illustrated in (a) in FIG. 5 present probabilities that each set of process data specified by time belongs to each cluster (Cluster 1, Cluster 2 or Cluster 3). More specifically, it presents that a probability that the process data at a time t1 belongs to Cluster 1 is 40%, a probability that the data belongs to Cluster 2 is 30%, and a probability that the data belongs to Cluster 3 is 30%. Here, Cluster 1, and the like, represent states of the plant 1 and correspond to, for example, normal operating (normal state), abnormal operating (abnormal state), etc.

The clustering results illustrated in (b) in FIG. 5 present probabilities that each set of process data belongs to each cluster (Cluster 1, Cluster 2 or Cluster 3). More specifically, it presents that a probability that TagA1 belongs to Cluster 1 is 30%, a probability that TagA1 belongs to Cluster 2 is 30%, and a probability that Tag A1 belongs to Cluster 3 is 40%. Here, Cluster 1, and the like, represent states of the plant 1 and correspond to, for example, normal operating, abnormal operating, etc. In the case where the clustering results presented in (b) in FIG. 5 are used for a process to be described below, it is preferable that elements over time, such as an average or a variance value of times at which the respective Tags are acquired, be added.

The possible causal relationship determination unit 113 is a processor that takes relevance between tags of a field device and other field devices, or the like, into consideration and defines the relevance as a possible causal parent-child relationship based on configuration information on the plant, such as a P&ID (Piping and Instrumentation Diagram), a control loop, and definition information of a monitoring screen, and that outputs the possible causal parent-child relationship to the causal model builder 114. Note that the P&ID is a schematized internal configuration information of the plant, such as the positions in which piping and field devices that are arranged in the plant are set.

Figure 6:
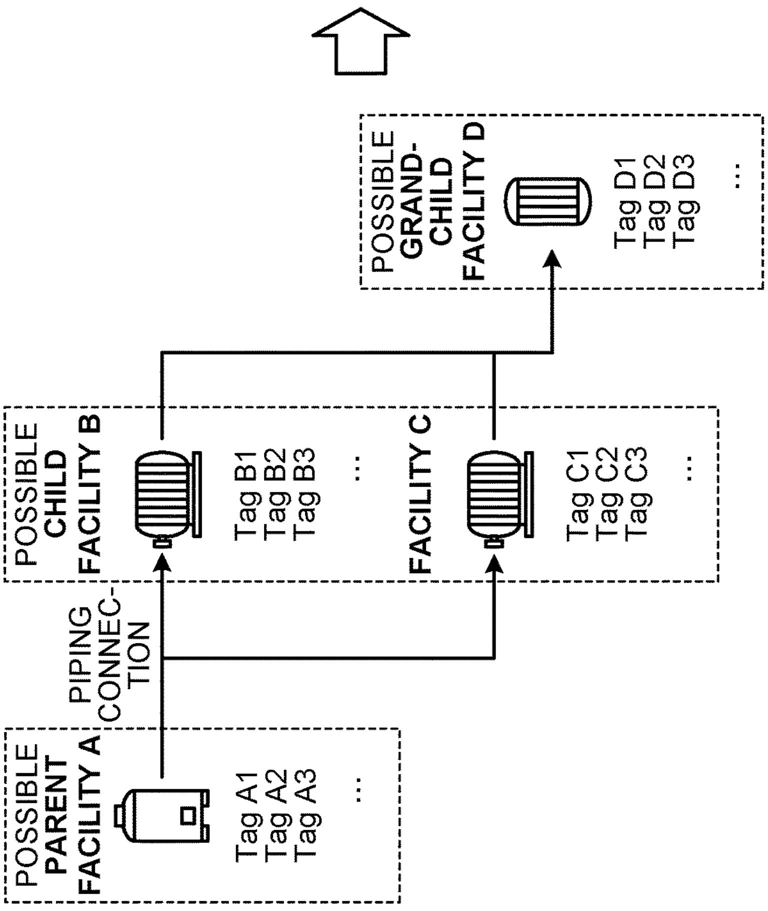
FIG. 6 is a diagram illustrating an example of determining a possible causal relationship.

FIG. 6 is a diagram illustrating an example of determining a possible causal relationship. The possible causal relationship determination unit 113 defines relevance between tags of a field device and other field devices, or the like, like an upstream and downstream positional relationship of piping, and the like, as a possible causal parent- child relationship in consideration of a relationship based on the domain knowledge of the operator and outputs the possible causal parent-child relationship to the causal model constructor 114.

For example, assume that, as illustrated in FIG. 6, "Tag A1, Tag A2", etc., are acquired from a facility A, "Tag B1, Tag B2", etc., are acquired from a facility B, "Tag C1, Tag C2", etc., are acquired from a facility C, and "Tag D1, Tag D2", etc., are acquired from a facility D. In this case, on specifying that the facility B and the facility C are positioned downstream with respect to the facility A and the facility D is positioned downstream with respect to the facility B and the facility C from piping information that is defined previously, etc., the possible causal relationship determination unit 113 determines the facility A as a possible parent, determines the facility B and the facility C as possible children, and determines the facility D as a possible grandchild. As illustrated in (a) in FIG. 6, the possible causal relationship determination unit 113 generates numerical data representing the parent-child relationship. For example, "-" represents not being defined as a possible parent-child relationship, that is, represents not being contained in a causal search area in training. "1" represents being positioned upstream and "0" represents being positioned downstream. The example in FIG. 6 exemplifies the possible causal relationship according to piping connection; however, it is exemplifying only and examples are not limited thereto. For example, it is possible to specify a possible causal relationship based on various sets of information, such as the hierarchy, the setting positions, and the setting sites of the facilities. A facility, or the like, corresponding to a possible causal relationship need not necessarily include a plurality of elements (Tags) and a facility including one element can be a subject of determination of a causal relationship.

The causal model builder 114 is a processor that builds a causal model between various variables (Tags) in the plant 1 and environmental factors (for example, changes in the outside temperature), clusters, objects (for example, quality, etc.,) by the Bayesian network, using logs of process data collected by the process data collector 111, the result of classification by the clustering unit 112, and information on the possible parent-child relationship obtained by the possible causal relationship determination unit 113.

For example, the causal model builder 114 prepares a training dataset to be used to train the causal model by the Bayesian network based on the pre-processed data and the result of clustering according to probabilities of membership to clusters. Training may reflect the result of clustering according to the probability of membership to each cluster as a data occurrence rate. Such a method is enabled because the Bayesian network is a statistical probability model that expresses relationships of several variables by conditional probabilities. Such a method need not necessarily be employed when membership is in a cluster with the highest probability and membership of data is determined as "0 or 1" intendedly (utilization of a soft clustering result as hard clustering).

FIG. 7 is a diagram illustrating an example 1 of generation of a training dataset for causal model training. As illustrated in FIG. 7, the causal model builder 114 joins the pre-processed data and the clustering results based on time and copies the aligned data by membership probabilities. For example, as for the data at the time t1, because the probability of membership to Cluster 1 is "40%", the causal model builder 114 generates four sets of data at the time t1 of "Cluster 1=1, Cluster 2=0, and Cluster 3=0" representing membership to Cluster 1. Similarly, as for the data at the time t1, because the probability of membership to Cluster 2 is "30%", the causal model builder 114 generates three sets of data at the time t1 of "Cluster 1=0, Cluster 2=1, and Cluster 3=0" representing membership to Cluster 2. As for the data at the time t1, because the probability of membership to Cluster 3 is "30%", the causal model builder 114 generates three sets of data at the time t1 of "Cluster 1=0, Cluster 2=0, and Cluster 3=1" representing membership to Cluster 2.

FIG. 8 is a diagram illustrating an example 2 of generation of a training dataset for causal model training. As illustrated in FIG. 8, the causal model builder 114 joins the pre-processed data and the clustering results based on time and discretizes Clusters of the aligned data by membership probabilities. For example, as for the data at the time t1, because the probability of membership to Cluster 1 is the highest, the causal model builder 114 generates data at the time t1 of "Cluster 1=1, Cluster 2=0, and Cluster 3=0" representing membership to Cluster 1. Similarly, as for the data at the time t2, because the probability of membership to Cluster 2 is the highest, the causal model builder 114 generates data at the time t2 of "Cluster 1=0, Cluster 2=1, and Cluster 3=0" representing membership to Cluster 2. As for the data at the time t3, because the probability of membership to Cluster 3 is the highest, the causal model builder 114 generates data at the time t3 of "Cluster 1=0, Cluster 2=0, and Cluster 3=1" representing membership to Cluster 3.

As described in FIG. 7 and FIG. 8, the causal model builder 114 is able to augment each set of training data according to probabilities. The causal model builder 114 adds information that specifies "quality" of the plant 1 serving as the object to each set of data. In an example, for the "quality", "1" is set in a normal state and "0" is set in an abnormal state. Information on the "quality" can also be acquired together with the process data or can also be set by the manager, or the like.

Subsequently, based on the above-described dataset for training and the information on the causal possible parent-child relationship that is generated by the possible causal relationship determination unit 113, the causal model builder 114 executes structure training of the Bayesian network that is an example of the causal model. Here, nodes with significant probabilistic dependence in the causal possible parent-child relationship are expressed by a directed graph and each node retains a conditional probability table (CPT) as quantitative information. Note that the causal model builder 114 may make a highlight display of nodes corresponding to controllable tags among the modes as information useful to the operator.

Figure 9:
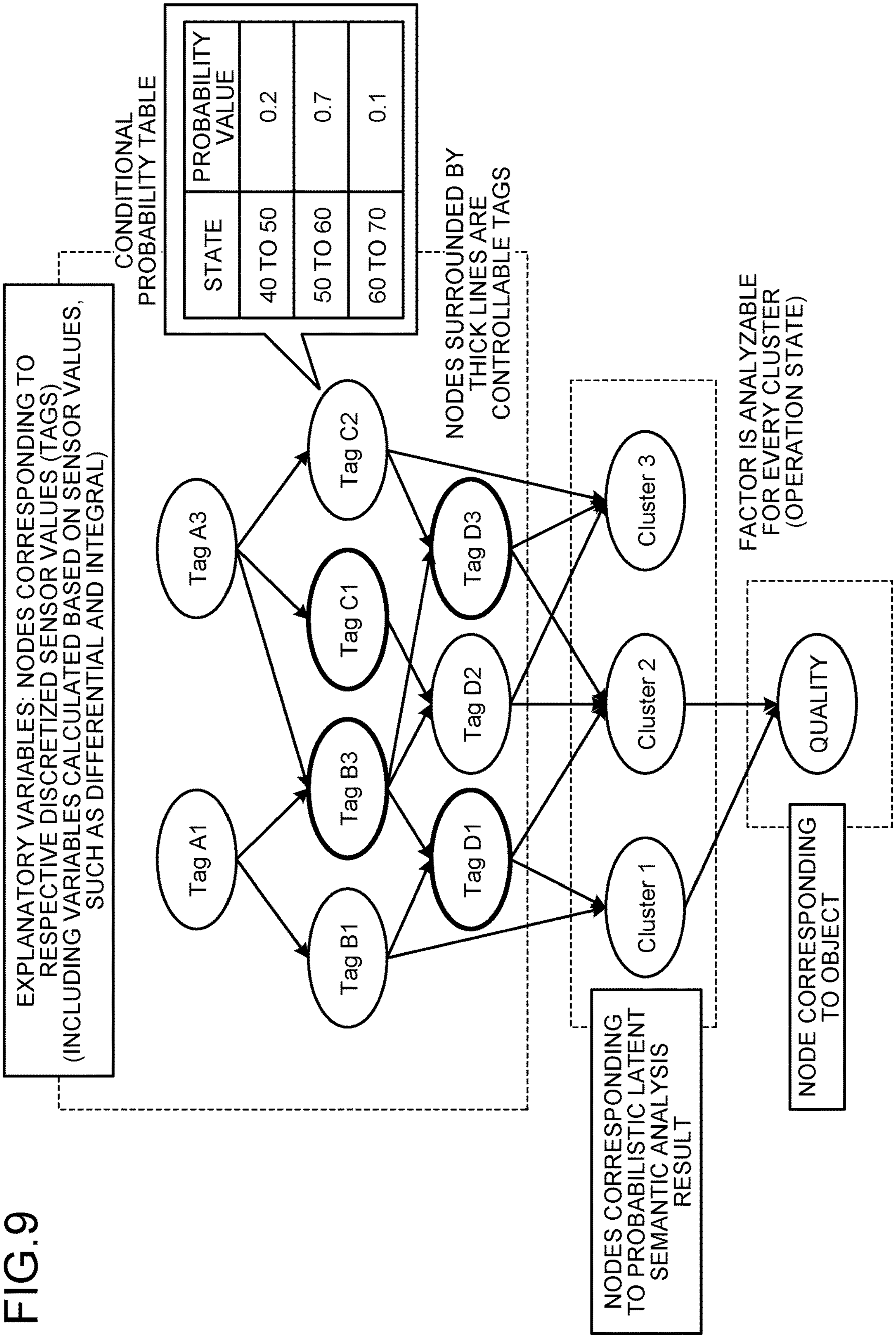
FIG. 9 is a diagram illustrating an example of a Bayesian network that has been trained.

FIG. 9 is a diagram illustrating an example of the Bayesian network that has been trained. The causal model builder 114 generates the Bayesian network illustrated in FIG. 9 by executing structure training (training) of the Bayesian network using, as training data, the dataset for training illustrated in FIG. 7 or FIG. 8 and the causal relationship presented in (a) in FIG. 6. The generated Bayesian network contains the node of "quality" corresponding to the object, each of the nodes of "Cluster 1, Cluster 2, and Cluster 3" corresponding to the result of probabilistic latent semantic analysis, and each of the nodes corresponding to the respective discretized sensor values (Tags) that are explanatory variables. The nodes corresponding to the respective tags contains variables that are calculated based on the sensor values, such as a differential and an integral.

Each of the Tags that are the respective nodes corresponding to the respective explanatory variables contains a conditional probability table. For example, "Tag C2" illustrated in FIG. 9 is taken as an example and "Tag C2" contains a probability table presenting that the probability of occurrence of the state of "40-50" is "20%", the probability of occurrence of the state of "50-60" is "70%", and the probability of occurrence of the state of "60-70" is "10%". Note that a known method can be employed for the algorithm on the structure training of the Bayesian network. FIG. 9 displays the nodes corresponding to controllable tags whose values are changeable by the operator in thick frames.

Back to FIG. 2, the analyzer 115 is a processor that, based on the causal model (Bayesian network) that is built by the causal model builder 114, extracts an element with a significant probability (effect) and a state value thereof, a path with a significant effect (probability), etc., according to an analysis result, such as a posterior probability based on prediction on a scenario to be known and corresponding to various premises. The analyzer 115 is a processor that makes a conversion into a form corresponding to a QMM.

Specifically, by applying an evidence state (evidence) to each intended node and performing prediction as a scenario to be known in the trained Bayesian network that is obtained by the causal model builder 114, the analyzer 115 is able to calculate a posterior probability distribution of each node. The analyzer 115 extracts an element with a high posterior probability value and thereby is able to calculate a node having a significant effect (corresponding to a management point of the QMM) in the scenario and a state value thereof (corresponding to a management criterion of the QMM) and a probability value thereof. The analyzer 115 also uses an objective variable as a base and follows a parent node with a large posterior probability value and thereby is able to calculate a propagation path having a significant effect in the scenario. The analyzer 115 is able to capture a path with the largest probability visually because a highlight display of the directed graph is made. Furthermore, the analyzer 115 is able to copy a path corresponding to the path with the largest probability on the Bayesian network and the state value on the P&ID as a form that is more understandable by the operator.

Figure 10:
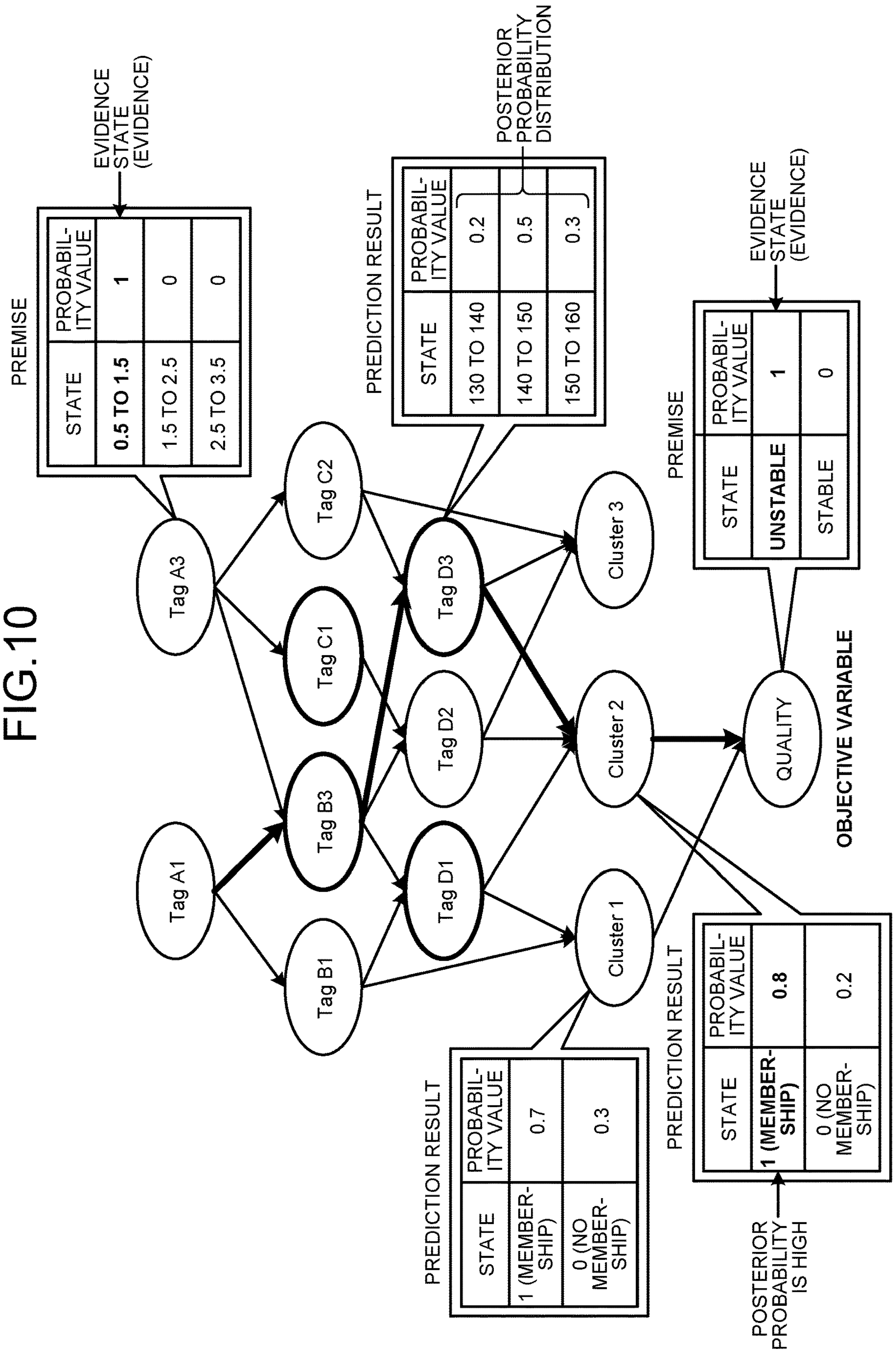
FIG. 10 is a diagram illustrating an example of visualization of a result of prediction by the Bayesian Network.

FIG. 10 is a diagram illustrating an example of visualization of a result of prediction by the Bayesian Network. Assume that the operator specifies that "the quality is unstable when Tag A3 is low" as a premise. As illustrated in FIG. 10, the analyzer 115 sets "1" for the probability value of "0.5-1.5" in the lowest state in the conditional probability table that the node of "Tag A3" has and sets "0" for others. Furthermore, the analyzer 115 sets "1" for the probability value corresponding to the "unstable" of "state" in the conditional probability table that the node of "quality" has and sets "0" for a probability value corresponding to "stable". After setting the evidence as described above, the analyzer 115 executes the Bayesian network and acquires a prediction result.

As a result, the analyzer 115 updates the probability values of the individual variables (nodes) that meet the premise, thereby specifying condition dependence of each node. For example, the posterior probability distribution of the node of "Cluster 1" is updated to "state 1 (membership) and probability value (0.7)" and "state 2 (no membership) and probability value (0.3)" and the posterior probability distribution of the node of "Cluster 3" is updated to "state 1 (membership) and probability value (0.8)" and "state 2 (no membership) and probability value (0.2)". Furthermore, for example, the posterior probability distribution of the node of "Tag D3" is updated to "state (130-140) and probability value (0.2)", "state (140-150) and probability value (0.5)", and "state (150-160) and probability value (0.3)".

By selecting a node with the highest probability value that is an example of a variable with high relevancy (relevant variable) from the node of "quality" that is an objective variable in an upstream direction (in the direction to upper layers in the Bayesian network), the analyzer 115 is able to specify a node relevant to the premise that "the quality is unstable when Tag A3 is low". For example, the analyzer 15 specifies node quality, a node of "Cluster 2", a node of "Tag B3" and a node of "Tag A1".

Thereafter, according to the result of prediction under the intended premise, the analyzer 115 generates information corresponding to a QMM in a form from the perspective of the operator that enables the operator to make a comparison with a conventional reference and make an examination easily and that the operation can reflect immediately. FIG. 11 is a diagram illustrating an example of presentation of information corresponding to a QMM that is calculated by prediction by the Bayesian Network. As illustrated in FIG. 11, for each of the nodes with high degrees of effect of the premise that is specified in FIG. 10, the analyzer 115 generates the information corresponding to a QMM and presented in (a) in FIG. 11 and the comparison information presented in (b) in FIG. 11 and displays the information.

The information corresponding to a QMM and illustrated in (a) in FIG. 11 is information containing "management point, management criterion, probability value, and degree of compliance". Here, "management point" represents each node with high relevancy to the premise that is specified in FIG. 10. "Management criterion" represents a state in which the probability value is the highest are a result of the above-described prediction and "probability value" is the provability value. "Degree of compliance" is an example of degree information and is the rate of the value of the management criterion that is contained in the all collected process data.

The comparison information illustrated in (b) in FIG. 11 is information containing "existing QMM management criterion, average of all data, mode of all data, maximum of all data, minimum of all data, and standard deviation of all data". Here, "existing QMM management criterion" is a reference value that is set previously. "Average of all data, mode of all data, maximum of all data, minimum of all data, and standard deviation of all data" are statistics of the corresponding data in the collected all process data.

Explained using the above-described example, with respect to Tag A1 determined as being with a high degree of effect of the premise, the analyzer 115 specifies or calculates and displays "20-23° C., 74% and 88%", or the like, as "management criterion, probability value, and degree of compliance" and specifies or calculates and displays "○-○° C., ○° C., ○° C., ○° C., ○° C., and ○° C.", or the like, as "existing QMM management criterion, average of all data, mode of all data, maximum of all data, minimum of all data, and standard deviation of all data". Note that simplified notations are made here and numerical values are put in ○".

As described above, the analyzer 115 is able to define "degree of compliance" and quantitatively express at how much rate (frequency) the management criterion is complied with in a subject period. Note that, with respect to each of the extracted nodes (management points) and the state values thereof (management criterion), the analyzer 115 outputs, as comparison information to the trend of all the data to be analyzed, basic statistics, such as an average, a mode, a maximum, a minimum, and a standard deviation of all data, together. When there is an existing QMM that is referred to in the plant 1 practically, the analyzer 115 presents the content thereof together as comparison information.

Back to FIG. 2, the display unit 116 is a processor that displays and outputs various types of information. Specifically, the display unit 116 displays the trained Bayesian network. The display unit 116 visually represents the node with a significant effect based on the result of prediction in the scenario (various premises and hypotheses) described above and the state value and the probability value thereof, the path with the largest probability, and the information corresponding to a QMM to a user, such as the manager or the operator of process operation in the plant. Accordingly, the user determines whether the result is trustworthy, that is, whether the result and explanation are convincing and reasonable from the mechanism of process variance and known findings.

Flow of Process

Figure 12:
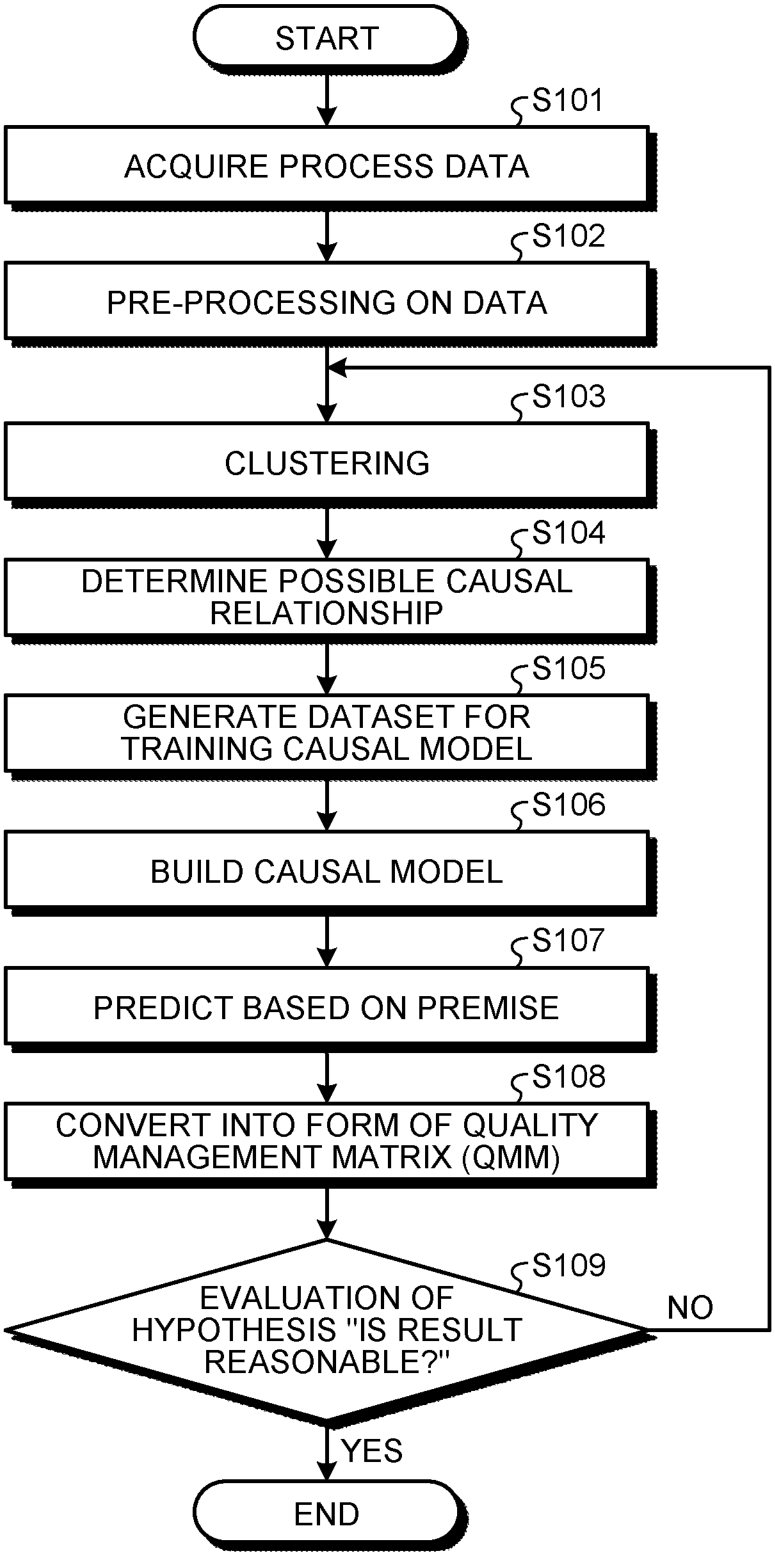
FIG. 12 is a flowchart illustrating a flow of a process of the first embodiment.

FIG. 12 is a flowchart illustrating a flow of a process of the first embodiment. As illustrated in FIG. 12, once the user including the manager and the operator issues an instruction to start an analysis process, the process data collector 111 acquires process data from the historian database 12 (S101).

Subsequently, the clustering unit 112 executes discretization and the pre-processing of missing values and outliers on the collected process data (S102) and executes, on the pre-processed data, clustering of elements of time and elements of tags of the process data by probabilistic latent semantic analysis (S103). For example, there is sometimes a tag that is not contained in the process data. In such a case, the clustering unit 112 executes clustering after setting an average or a value that is specified previously.

The possible causal relationship determination unit 113 determines a possible causal relationship based on a parent-child relationship of facilities, or the like, on which “Tag” contained in the process data is output (S104).

Subsequently, based on the pre-processed data obtained at S102 and the result of clustering by membership probabilities to each cluster that is obtained at S103, the causal model builder 114 generates a dataset for training a causal model by a Bayesian network (S105). Thereafter, the causal model builder 114 performs structure training on the Bayesian network based on the training dataset obtained at S105 and information on the possible parent-child relationship obtained at S104 (S106).

In the trained Bayesian network that is obtained from S106, the analyzer 115 applies an evidence state to each intended node as a scenario to be known and executes prediction (S107). Using the result of the prediction under an intended premise, the analyzer 115 generates the information corresponding to a QMM illustrated in FIG. 11 (S108). As a result, the display unit 116 is able to execute a display output of the prediction result, the information corresponding to a QMM, etc.

Here, it is determined whether the result (explanation) is convincing to the user (S109). Here, on receiving an input indicating that the user is convinced (S109: Yes), the information processing device 10 ends the series of analyses. On the other hand, on receiving an input indicating that the user is not convinced (S109: No), the information processing device 10 returns to S103, changes the subject to be analyzed and the clustering condition, changes the hypothesis of the possible parent-child relationship at S104, and executes analysis again.

Effect

As described above, utilizing probabilistic latent semantic analysis and a Bayesian network, the information processing device 10 extracts a factor that has an effect on a production management index, such as quality, by machine learning from complex operation data containing environmental changes, such as the production four elements for products in the plant 1. The information processing device 10 is able to assist an operator in quick decision making during operation by converting a machine learning result into a form that is easy for the operator to consider and understand and representing the form.

The information processing device 10 is able to, in multidimensional process data in which various physical phenomena and effects of environmental changes are complexly intertwined, simplify an event by performing classification into a similar operation state and a relevant tag while avoiding the so-called curse of dimensionality and increase interpretation of a result by analyzing a compositive factor to an event.

The information processing device 10 applies a result of soft clustering according to membership probabilities to model training and thus is able to increase accuracy in factor analysis also in process data in which various physical phenomena are complexly intertwined. The information processing device 10 embeds a clustering result, physical relevance between ages, known environmental changes, and information based on the domain findings and experiences of the operator in a model and thus is able to make an analysis based on a reactive process and realize building of a model that is highly reliable and convincing.

The information processing device 10 visualizes a node and a propagation path having significant effects and controllable tags from a prediction result in a scenario to be known and corresponding to various premises and hypotheses and thus is able to effectively narrow down elements that are highly effective in control. The information processing device 10 makes a presentation in a form corresponding to a QMM in perspective of the operator and thus the operator is able to make a comparison with a conventional condition, which leads to quick understanding of the current situation and discovery of a new problem and enables, and it is possible to utilize the result as a new operation condition.

In trend analysis or correlation analysis in process data, an analysis is made exhaustively in many cases and it is considered that an extremely long time is required when interpretation of the result is contained. In a general machine learning model, such as deep learning, it is considered that many explanatory variables (feature values) are a factor of lowering of interpretation, of an increase in the time of training, and of lowering of versatility due to overfitting.

Figure 13:
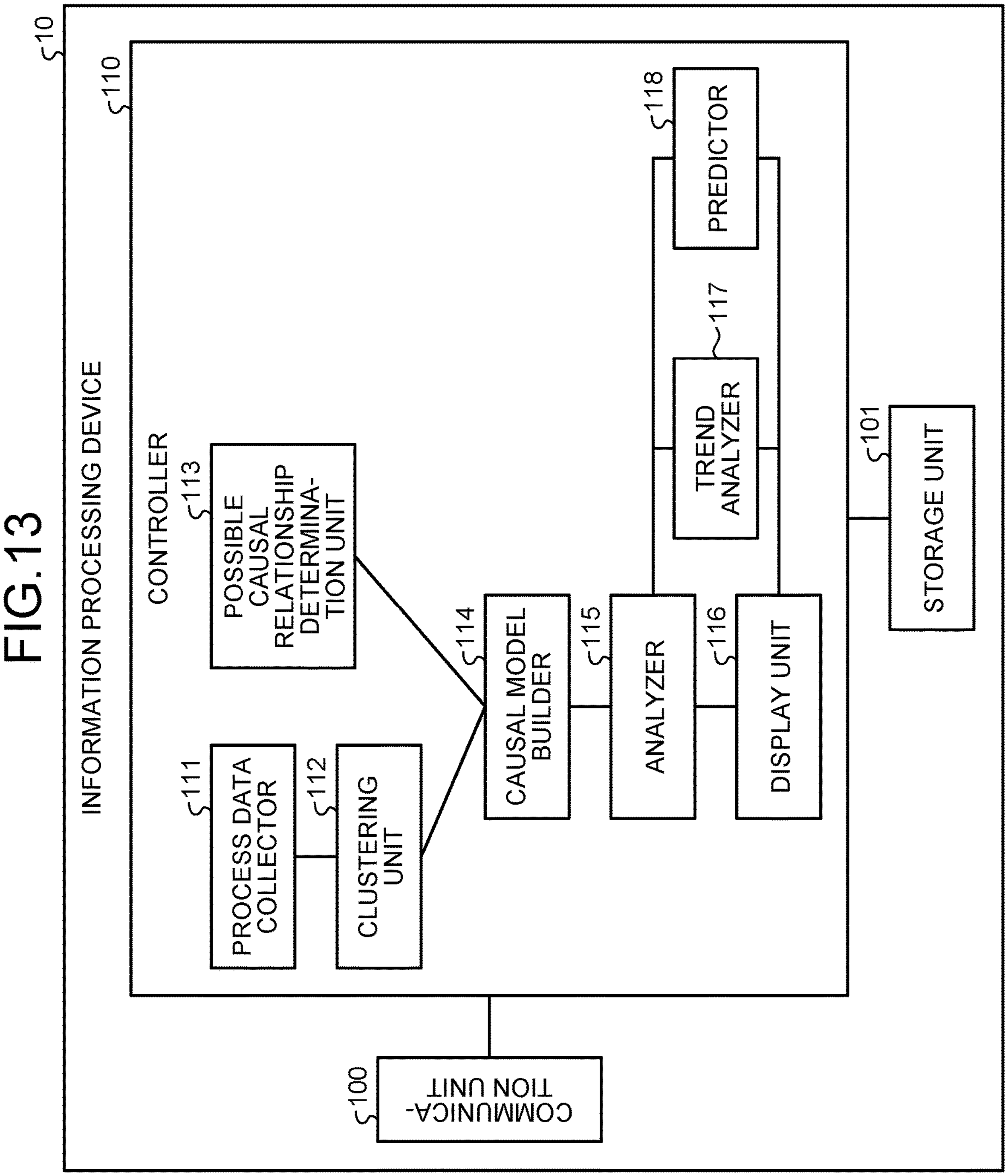
FIG. 13 is a functional block diagram illustrating a functional configuration of an information processing device 10 according to a second embodiment.

Thus, in a second embodiment, the information processing device 10 that makes an improvement in accuracy of subsequent various types of analyses and of a machine leaning model using the result of the first embodiment will be described. FIG. 13 is a functional block diagram illustrating a functional configuration of the information processing device 10 according to the second embodiment. Here, a trend analyzer 117 and a predictor 118 that are functions different from those of the first embodiment will be described here.

The trend analyzer 117 is a processor that executes a trend analysis or a correlation analysis using an analysis result obtained by the analyzer 115. The predictor 118 is a processor that generates a machine learning model using the analysis result that is obtained by the analyzer 115 and, using the machine learning model, predicts a state of the plant 1, a value of each Tag, etc.

Figure 14:
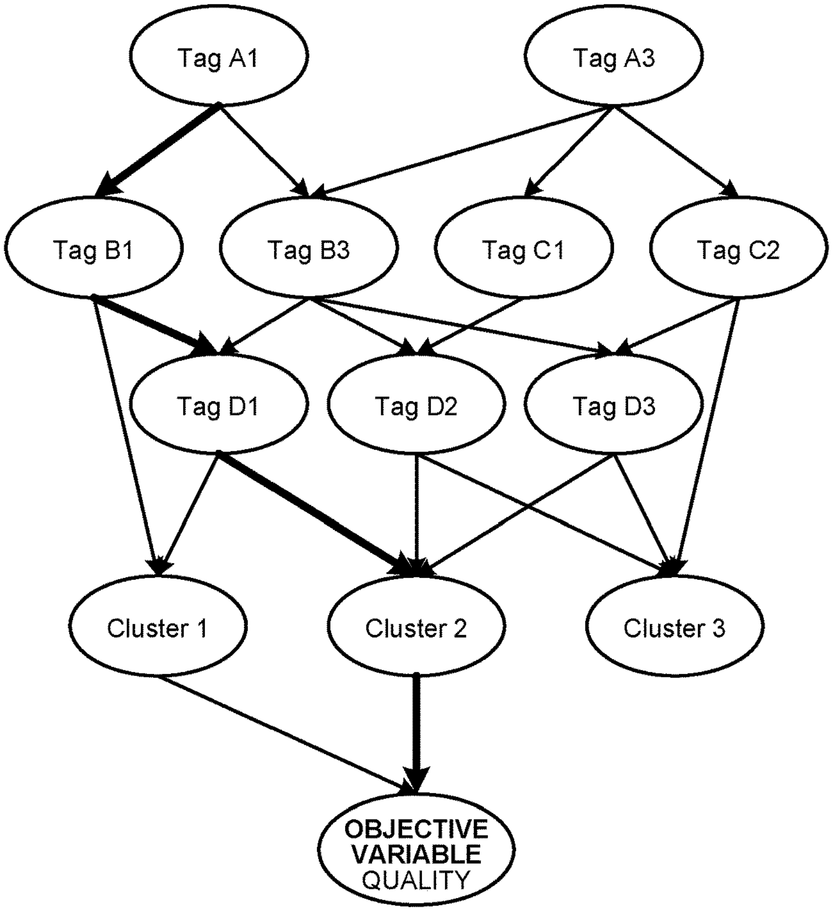
FIG. 14 is a diagram illustrating a process according to the second embodiment.

FIG. 14 is a diagram illustrating a process according to the second embodiment. As illustrated in FIG. 14, the analyzer 115 executes the process described in the first embodiment, thereby performing a sensitivity analysis on objective variables obtained when an evidence is applied to various explanatory variables. In other words, by calculating a posterior probability value of an objective variable, a difference between a prior probability and a posterior probability, etc., the analyzer 115 is able to extract a variable (Tag) with a significant effect on the objective variable. Here, the example in which "Tag D1, Cluster 2, and Tag A1" are extracted as important tags is presented.

The trend analyzer 117 refers to the result of the analysis and performs trend analysis and correlation analysis selectively from the important tags using the process data that is original data of the analysis. Explained using the above-described example, the trend analyzer 117 calculates a shift of each of the important tags over time and a degree of correlation of each of the important tags using the process data corresponding to each of the important tags "Tag D1, Cluster 2, and Tag A1".

As a result, because it is possible to extract tags important to the object previously, it is possible to proceed with the analysis selectively from the important tags and goes further partly if required and thus an improvement in analysis efficiency is expectable.

The predictor 118 executes model training using the important tags according to the analysis result as feature values of a general machine learning model, such as deep learning. Explained using the above-described example, the predictor 118 acquires process data of each of the important tags "Tag D1, Cluster 2, and Tag A1" and the quality at that time. In other words, the predictor 118 generates "process data of Tag D1 and quality", or the like. The predictor 118 executes machine leaning in which "process data of Tag D1" serves as an explanatory variable and "quality" serves as an objective variable from the data of "process data of Tag D1 and quality", thereby generating a quality prediction model. Thereafter, on acquiring the latest process data, the predictor 118 inputs the latest process data to the quality prediction model, acquires a result of predicting the quality of the plant 1, and makes a display output of the result to the operator, or the like.

As described above, in the predictor 118, it is possible to cut feature values that have no effect on the objective variable or feature values that have small effects as much as possible previously. As a result, it is possible to previously extract important feature values (such as tags and clusters) having significant effects on the objective variable and building a prediction model using the important feature values as feature values enables expectation of an improvement in analysis efficiency.

The embodiments of the invention have been described, and the invention may be carried out in various modes in addition to the above-described embodiments.

Causal Relationship

Figure 15:
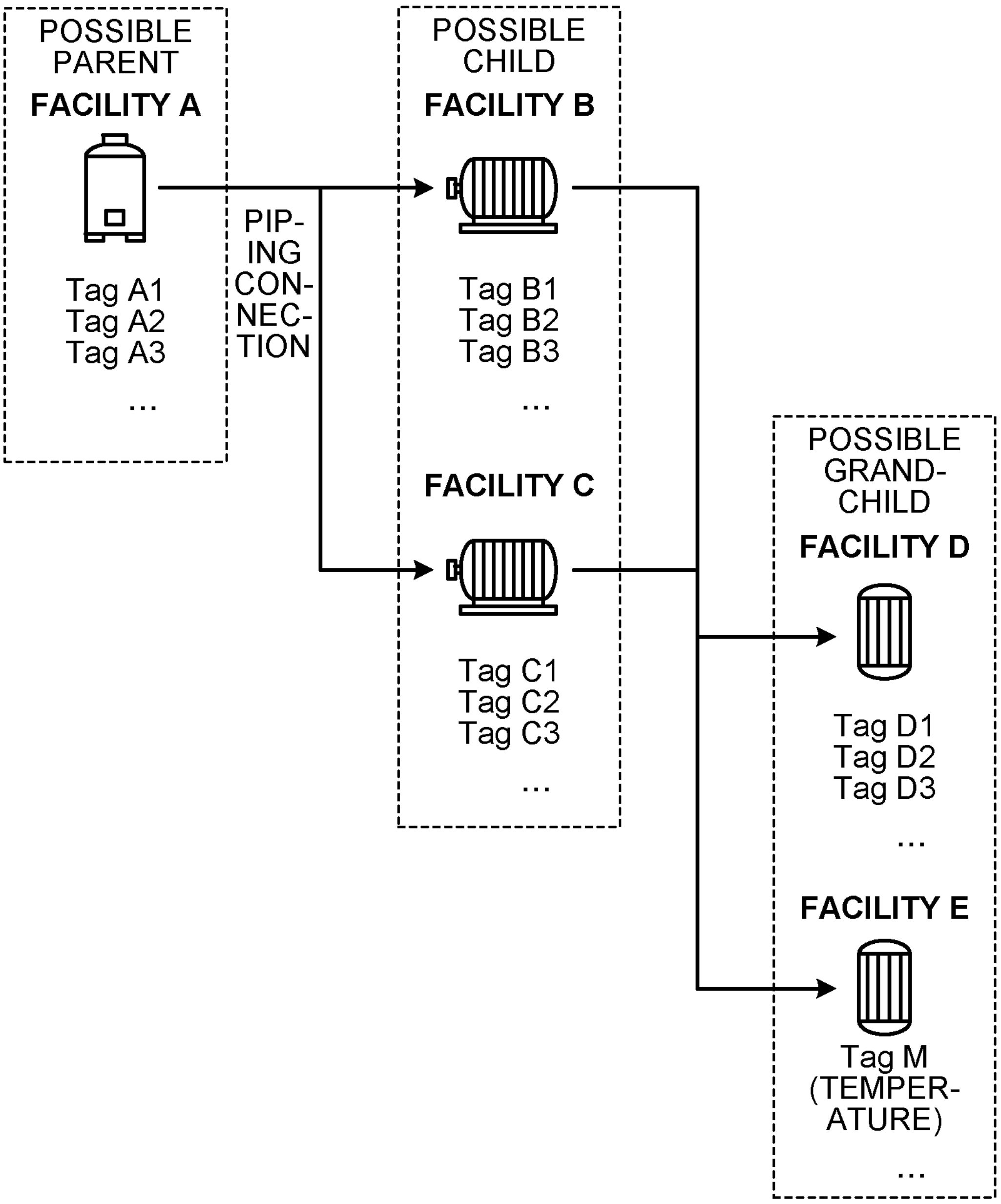
FIG. 15 is a diagram illustrating an example of application of a causal relationship.

For example, the causal relationship illustrated in FIG. 1 is an example and it is possible to add other elements and increase or reduce layers. FIG. 15 is a diagram illustrating an example of application of a causal relationship. As illustrated in FIG. 15, for example, it is possible to add, as a possible grandchild, "Tag M" that is information on the temperature of a facility E to a causal relationship (parent-child relationship). In another example, it is possible to add an outside temperature, or the like, as a possible parent of all the facilities illustrated in FIG. 6. Adding a new element as described above enables an increase in the number of dimensions to be trained in the Bayesian network and thus it is possible to increase accuracy of the Bayesian network. In addition to the temperature, for example, a possible causal relationship based on an environmental change that can have an effect, such as the outside temperature or presence or non-presence of human operational intervention or facility maintenance, or experience of the operator, or the like, such as frequent low quality during the night time, may be added.

Numerical Values, etc.

The type of process data, the number of Tags, the number of clusters, the threshold, the number of sets of data, etc., used in the above-described embodiments are an example only and are changeable freely. "Quality" is exemplified and described as an example of the object; however, the object is not limited to this. For example, a more detailed object, such as a failure type in the plant 1, can be set or a state of a device X of the plant 1, or an artificial factor, such as an error by an operator, can be set.

The Bayesian network is an example of the causal model and it is possible to employ various graphical causal models and probabilities. The respective nodes (respective tags) in the causal model, such as the Bayesian network, correspond to a plurality of variables on operation of the plant 1. Each variable that is specified as having the highest probability value based on a prediction result corresponds to a relevant variable dependent on a premise. Training and prediction of the Bayesian network is executable regularly in a certain period or is executable after operation of a day by batch processing, or the like. Deep learning is an example of machine learning and various algorithms, such as a neural network, deep learning, and support vector machine, can be employed.

System

The process procedure, control procedure, specific names, and information including various types of data and parameters that are presented in the above description and the drawings are changeable freely unless otherwise noted. Each of the facilities illustrated in FIG. 6 is an example of a constituent device. The form of display in FIG. 11 is an example only and the form is changeable freely to a pull-down form, or the like, and selection of the comparison information is also changeable freely. The information processing device 10 is also able to acquire plant data directly from the plant 1.

Each component of each device illustrated in the drawings is a functional idea and need not necessarily be configured physically as illustrated in the drawings. In other words, specific modes of distribution and integration of devices are not limited to those illustrated in the drawings. In other words, all or part of the devices can be configured by functional or physical distribution or integration in any unit according to various types of load and usage.

Furthermore, all or given part of each processing function implemented by each device can be implemented by a CPU or a program that is analyzed and executed by the CPU or can be implemented as hardware according to a wired logic.

Hardware

Figure 16:
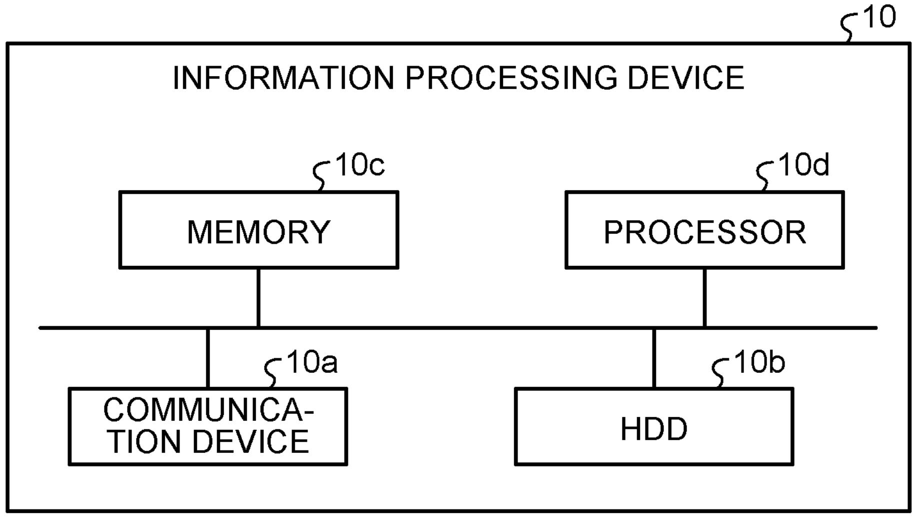
FIG. 16 is a diagram illustrating an example of a hardware configuration.

An example of a hardware configuration of the information processing device 10 will be described next. FIG. 16 is a diagram illustrating the example of the hardware configuration. As illustrated in FIG. 16, the information processing device 10 includes a communication device 10*a*, a HDD (Hard Disk Drive) 10*b*, a memory 10*c*, and a processor 10*d*. The units illustrated in FIG. 16 are connected mutually by a bus, or the like.

The communication device 10*a* is a network interface card, or the like, and communicates with another server. The HDD 10*b* stores a program that implements the functions illustrated in FIG. 2 and the DB.

The processor 10*d* reads the program that executes the same process as that of each of the processors illustrated in FIG. 2 from the HDD 10*b*, or the like, and loads the program in the memory 10*c*, thereby running the process that implements each of the functions illustrated in FIG. 2, etc. For example, the process executes the same function as that of each of the functions that the information processing device 10 includes. Specifically, the processor 10*d* reads the program with the same functions as those of the process data collector 111, the clustering unit 112, the possible causal relationship determination unit 113, the causal model builder 114, the analyzer 115, and the display unit 116, etc., from the HDD 10*b*, or the like. The processor 10*d* executes the process that executes the same processing as that performed by the process data collector 111, the clustering unit 112, the possible causal relationship determination unit 113, the causal model builder 114, the analyzer 115, and the display unit 116, etc.

As described above, the information processing device 10 runs as an information processing device that executes an analysis method by reading and executing the program. The information processing device 10 may read the above-described program from a recording medium using a medium reading device and execute the read program, thereby implementing the same functions as those of the above-described embodiments. Other programs according to other embodiments are not limited to being executed by the information processing device 10. For example, the disclosure is similarly applicable to the case where another computer or another server executes the program or the computer and the server executes the program cooperatively.

The program can be distributed via a network, such as the Internet. The program can be recorded in a computer-readable recording medium, such as a hard disk, a flexible disk (FD), a CD-ROM, a MO (Magneto-Optical disk), or a DVD (Digital Versatile Disc), can be read by a computer from the recording medium, and thus can be executed.

REFERENCE SIGNS LIST

10 INFORMATION PROCESSING DEVICE
100 COMMUNICATION UNIT
101 STORAGE UNIT
110 CONTROLLER
111 PROCESS DATA COLLECTOR
112 CLUSTERING UNIT
113 POSSIBLE CAUSAL RELATIONSHIP DETERMINATION UNIT
114 CAUSAL MODEL BUILDER
115 ANALYZER
116 DISPLAY UNIT

The invention claimed is:

1. A computer-implemented analysis method comprising:

acquiring a prediction result obtained when a premise is applied to a causal model having a plurality of variables related to operation of a plant;

based on the prediction result, specifying a relevant variable dependent on the premise from the plurality of variables;

with respect to the relevant variable, displaying information on a state of the relevant variable obtained according to the prediction result and a statistic of plant data corresponding to the relevant variable in plant data that is generated in the plant; and extracting a factor that has an effect on a production management index by machine learning from multidimensional operation data containing environmental changes for products in the plant, and converting a result of the machine learning into a form that is easy for an operator to consider and understand and representing the form to the operator so as to assist the operator in quick decision making during the operation, wherein the computer-implemented analysis method further comprises:

collecting a plurality of sets of process data that are output from the plant and that contain the plurality of variables;

executing clustering of classifying the sets of process data by an operation state of the plant; and using training data including the process data and a result of the clustering, executing a structure training on the causal model, and wherein the executing clustering includes clustering elements of time and elements of tags of the process data, and calculating respective membership probabilities.

2. The analysis method according to claim 1, wherein the displaying includes displaying, as the information on the state of the relevant variable, a condition and a probability value that are obtained according to the prediction result and degree information quantitatively representing a degree at which the condition is complied with in the operation of the plant.

3. The analysis method according to claim 1, wherein the executing includes based on relevance of constituent devices that constitute the plant, specifying a parent-child relationship of the constituent devices; and using the training data including the process data, the result of clustering, and the parent-child relationship, executing the structure training on the causal model.

4. The analysis method according to claim 3, wherein the executing includes, using the training data and an objective variable representing a state of the plant, executing structure training on a Bayesian network, the acquiring includes acquiring the prediction result by prediction performed by inputting the premise in which the variable serving as an object and the state of the plant are specified to a trained Bayesian network, the specifying includes specifying, in each cluster to which each node belongs in the Bayesian network, a node with the highest probability value obtained by the prediction as the relevant variable, and the displaying includes, with respect to the relevant variable, displaying the condition and the probability value that are obtained according to the prediction result, the degree information, and the statistic in a comparable manner.

5. The analysis method according to claim 1, wherein the information on the state of the relevant variable is a management criterion which represents a state in which a probability value is the highest as a result of the prediction.

6. The analysis method according to claim 1, wherein the statistic is information including an average of all data, a mode of all data, a maximum of all data, a minimum of all data, and a standard deviation of all data.

7. A non-transitory computer-readable recording medium having stored therein an analysis program that causes a computer to execute a process comprising:

acquiring a prediction result obtained when a premise is applied to a causal model having a plurality of variables related to operation of a plant;

based on the prediction result, specifying a relevant variable dependent on the premise from the plurality of variables;

with respect to the relevant variable, displaying information on a state of the relevant variable obtained according to the prediction result and a statistic of plant data corresponding to the relevant variable in plant data that is generated in the plant; and extracting a factor that has an effect on a production management index by machine learning from multidimensional operation data containing environmental changes for products in the plant, and converting a result of the machine learning into a form that is easy for an operator to consider and understand and representing the form to the operator so as to assist the operator in quick decision making during the operation, wherein the process further comprises:

collecting a plurality of sets of process data that are output from the plant and that contain the plurality of variables;

executing clustering of classifying the sets of process data by an operation state of the plant; and using training data including the process data and a result of the clustering, executing a structure training on the causal model, and wherein the executing clustering includes clustering elements of time and elements of tags of the process data, and calculating respective membership probabilities.

8. An information processing device comprising:

a processor configured to:

acquire a prediction result obtained when a premise is applied to a causal model having a plurality of variables related to operation of a plant;

based on the prediction result, specify a relevant variable dependent on the premise from the plurality of variables;

with respect to the relevant variable, display information on a state of the relevant variable obtained according to the prediction result and a statistic of plant data corresponding to the relevant variable in plant data that is generated in the plant; and extract a factor that has an effect on a production management index by machine learning from multidimensional operation data containing environmental changes for products in the plant, and convert a result of the machine learning into a form that is easy for an operator to consider and understand and representing the form to the operator so as to assist the operator in quick decision making during the operation, wherein the processor is further configured to:

collect a plurality of sets of process data that are output from the plant and that contain the plurality of variables;

execute clustering of classifying the sets of process data by an operation state of the plant; and using training data including the process data and a result of the clustering, execute a structure training on the causal model, and wherein executing clustering includes clustering elements of time and elements of tags of the process data, and calculating respective membership probabilities.

* * * * *